United States Patent [19]

Beyer et al.

[11] Patent Number: 4,924,632
[45] Date of Patent: May 15, 1990

[54] CIRCULAR GRINDING MACHINE

[75] Inventors: Rudolf Beyer, Esslingen; Lutz-Peter Heerdt, Altbach; Roland Schemel, Stuttgart, all of Fed. Rep. of Germany

[73] Assignee: Schaudt Maschinenbau GmbH, Stuttgart, Fed. Rep. of Germany

[21] Appl. No.: 743,604

[22] Filed: Jun. 11, 1985

[30] Foreign Application Priority Data

Jun. 27, 1984 [DE] Fed. Rep. of Germany ....... 3423558

[51] Int. Cl.$^5$ ............................................. B24B 5/00
[52] U.S. Cl. ............................... 51/105 R; 51/103 C; 51/72 R; 51/50 R
[58] Field of Search ............... 51/105 R, 103 C, 72 R, 51/50 R

[56] References Cited

U.S. PATENT DOCUMENTS 3,302,336  2/1967  Bowman ............................ 51/50 R
4,274,229  6/1981  Favrot ........................ 51/105 R X Primary Examiner—Frederick R. Schmidt
Assistant Examiner—M. Rachuba
Attorney, Agent, or Firm—Peter K. Kontler

[57] ABSTRACT

A circular grinding machine wherein the upper side of the base for the reciprocable tool supporting unit slopes upwardly from the front side toward the rear side of the base. The headstock and a reciprocable tailstock are mounted at the front side of the base so as to support workpieces at a level above a collecting vessel for spent liquid coolant which is sprayed or otherwise guided against the workpiece during removal of material. The ways for the carriage of the tool supporting unit and the ways for the tailstock are covered by shrouds so that their temperature cannot be influenced by the coolant, and the workpiece which is held between the centers of the headstock and tailstock is located in front of the base so that the major percentage of liquid coolant which descends from the material removing station into the collecting vessel bypasses the base. In this manner, the temperature of the base and/or of the ways on the base is not influenced by the coolant and any coolant which descends onto its upper side flows immediately toward and into the collecting vessel.

15 Claims, 2 Drawing Sheets

CIRCULAR GRINDING MACHINE

BACKGROUND OF THE INVENTION

The present invention relates to machine tools in general, and more particularly to improvements in machine tools of the type wherein the workpiece or workpieces and/or the tool or tools must be cooled by sprays or jets of liquid coolant during removal of material from and/or during other treatment of the workpieces. Typical examples of such machine tools are grinding machines, such as surface or circular grinding machines.

A circular grinding machine normally comprises a base or bed which carries the work holding members (such as a headstock and a tailstock) and also the tool supporting unit, e.g., a carriage for the spindle of a grinding wheel. The base is normally a block-shaped component with a horizontal top surface for the tool supporting unit. The latter can be fixedly mounted on the base or it is mounted for movement in the direction of the Z-axis. It is also customary to install a carriage-table system in front of the tool supporting unit and to provide the carriage-table system with a headstock and a tailstock as a means for holding of a selected workpiece during removal of material therefrom. The carriage-table system is movable in the direction of the Z-axis, i.e., at right angles to the X-axis and parallel to the axis of the grinding wheel in the tool supporting unit.

A drawback of the above outlined conventional grinding machines is that the liquid coolant, which is used in large quantities to prevent overheating of the workpiece(s) and/or tool(s), descends onto the horizontal top surface and thereby greatly influences the temperature of certain portions of the base, especially in the regions which can affect the quality of treatment of workpieces. The body of coolant which accumulates on the top surface of the base is likely to dwell there for extended intervals of time unless forcibly wiped away or unless replaced with freshly sprayed coolant. Moreover, the so-called slime or mud which develops during grinding also accumulates on the top surface of the base and must be removed by hand in a time-consuming operation. The non-uniform changes in the temperature of the base adversely affect the quality of the treatment, i.e., the accuracy of finish of the workpieces

OBJECTS AND SUMMARY OF THE INVENTION

An object of the invention is to provide a machine tool, particularly a grinding machine (such as a circular grinding machine) which is constructed and assembled in such a way that the liquid coolant cannot adversely affect the accuracy of treatment of the workpieces.

Another object of the invention is to provide a machine tool wherein the coolant cannot distort that part or those parts which can adversely influence the accuracy of treatment of the workpieces as a result of thermally induced expansion or contraction.

A further object of the invention is to provide a novel and improved machine tool wherein the coolant cannot adversely influence (particularly distort) the temperature of the base which supports the tool supporting unit as well as the member or members which hold one or more workpieces when the machine tool is in use.

An additional object of the invention is to provide a novel and improved mounting for the work holding members in a circular grinding machine.

A further object of the invention is to provide a novel and improved mounting for the base of a circular grinding machine.

Still another object of the invention is to provide a novel and improved mode of shielding the ways for various reciprocable components of a grinding machine from contact with sprays and/or streams of liquid coolant.

A further object of the invention is to provide a grinding machine wherein the accumulations of slime or mud are much less pronounced than in conventional machines.

Another object of the invention is to provide a novel and improved method of preventing liquid coolant from unequally influencing the temperature of those parts which determine the accuracy of treatment of the workpieces.

The invention resides in the provision of a machine tool, particularly a circular grinding machine, which comprises a stationary base having an elongated front side facing toward the operator or operators standing in front of the machine tool and provided with first and second elongated (preferably horizontal) guide means extending longitudinally of the front side and at right angles to the plane of the base, a tool supporting unit including a carriage which is mounted on the base and is movable along the first guide means, and at least one work holding member (such as a tailstock) which is mounted on the base and is movable along the second guide means at the front side of the base. The carriage preferably comprises additional guide means extending at right angles to the first guide means and the tool supporting unit then further comprises a slide which is mounted on the carriage for movement along the additional guide means and at least one tool support (such a a spindle for a grinding wheel) mounted on the slide.

The first and second guide means preferably include portions which are closely or immediately adjacent to each other. Each such portion can comprise substantially horizontal ways, and the ways of the first guide means are preferably located at a level above the ways of the second guide means. Shrouds are preferably provided for portions of or the entire first and second guide means.

The base preferably slopes at an acute angle to the horizontal in a direction from its front side to its rear side. The machine tool preferably further comprises a main support or frame which is mounted on the floor and has a supporting surface which is inclined to the horizontal through an angle which at least approximates the aforementioned acute angle. The base is mounted on the supporting surface of the frame.

The machine tool further comprises a source of liquid coolant (e.g., water) conduit means or the like for conveying coolant from the source against the workpiece which is held by the work holding member, and a vessel or analogous means for collecting the coolant which descends from the workpiece. The collecting means is located forwardly of the base. A workpiece which is held by the work holding member is preferably located forwardly of the base so that at least the major percentage of coolant flowing from the workpiece toward and into the collecting means bypasses the base. The aforementioned shrouds overlie portions of or the entire first and second guide means so as to shield such guide means from splashing coolant. In this manner, the coolant cannot influence the temperature of the base, i.e., of the means for supporting the work holding member and the tool supporting unit. Therefore, the coolant cannot affect the accuracy of treatment of the workpieces.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
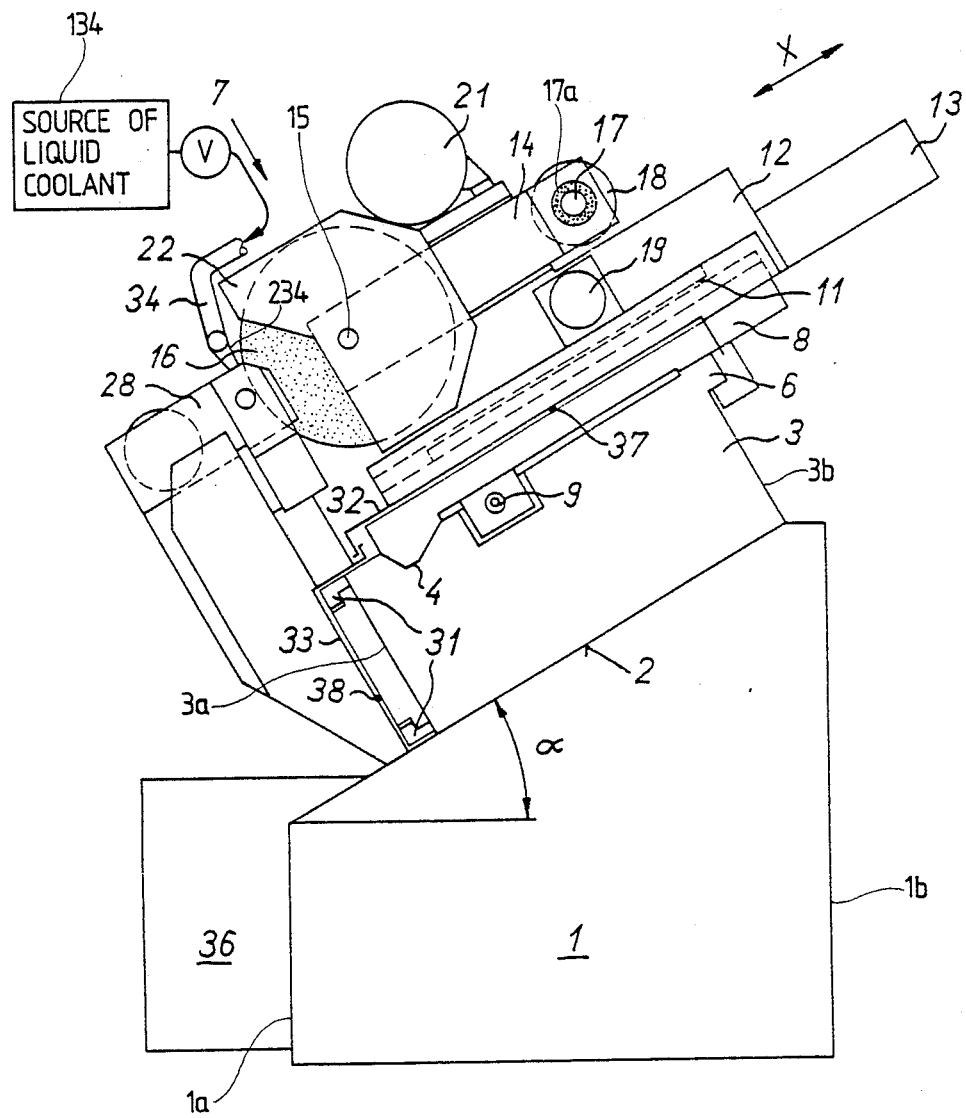
FIG. 1 is a somewhat schematic side elevational view of a circular grinding machine which embodies one form of the present invention.

The circular grinding machine which is shown in the drawing comprises a floor-mounted main support or frame 1 with a front side 1a, a rear side 1b and a supporting surface 2 which slopes with reference to the horizontal upwardly in a direction from the front side 1a toward the rear side 1b at an acute angle alpha of less than 45 degrees The surface 2 supports a similarly inclined base 3 whose front side 3a is elongated (as considered at right angles to the plane of FIG. 1) and is inclined with reference to the front side 1a of the frame 1. The rear side 3b of the base 3 may but need not be parallel to the front side 3a, and the entire base 3 slopes upwardly at the angle alpha.

Figure 2:
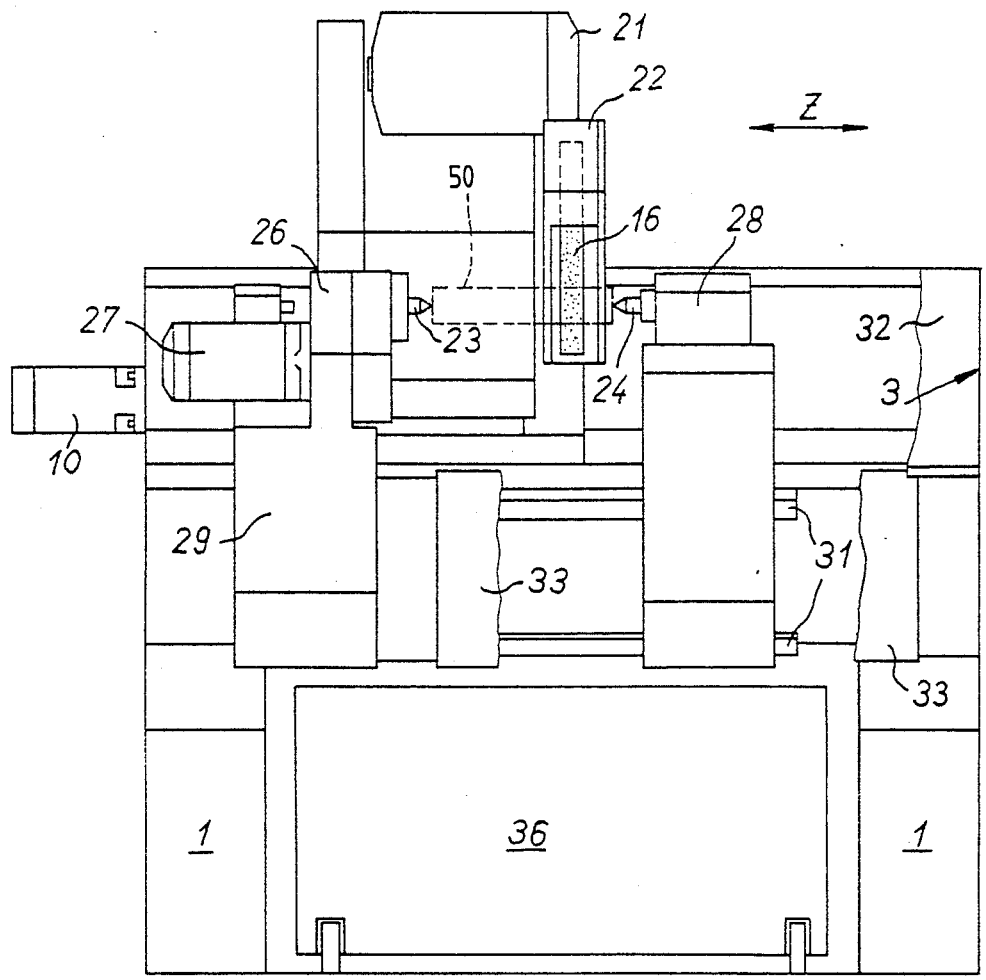
FIG. 2 is a front elevational view of the grinding machine as seen from the left-hand side of FIG. 1 with portions of the shrouds for the first and second guide means broken away.

The upper side of the base 3 is provided with elongated horizontal first guide means 4 and 6 which extend in the longitudinal direction of the front side 3a and constitute two elongated guide elements or ways for a carriage 8 forming part of a tool supporting or grinding unit 7. The ways 4 are closely adjacent to the front side 3a and hence to a portion of second elongated guide means 31 composed of two horizontal guide elements or ways for a work holding member in the form of a tailstock 28. The guide means 31 are parallel to the guide means 4, 6 and extend in the direction of the Z-axis, i.e., in parallelism with the axis of a rotary workpiece 50 (indicated in FIG. 2 by broken lines) which is held between the dead center 24 of the reciprocable tailstock 28 and the torque-receiving center 23 of a headstock 26. The headstock 26 is fixedly secured to the base 3 by a bracket 29.

The tool supporting unit 7 further comprises additional guide means 11 provided on the carriage 8 and extending at right angles to the guide means 4, 6 and 31. The guide means 11 comprises elongated ways extending in the direction of the X-axis of the grinding machine at the angle alpha to the horizontal, i.e., such ways slope upwardly in a direction from the front side 3a toward the rear side 3b of the base 3, the same as the supporting surface 2 of the frame 1. A slide 12 which is reciprocable along the additional guide means 11 can be moved toward and away from the front side 3a of the base 3 by a motor 13 which is mounted on the slide 12 or on the carriage 8. The purpose of the motor 13 is to feed the slide 12 and a grinding wheel (tool) 16 thereon toward the workpiece 50 (e.g., a crankshaft) which is held between the centers 23, 24 of the work holding members 26, 28. The grinding wheel 16 (which is designed to remove material from the external surface of the workpiece 50) is mounted on a spindle 15 which, in turn, is mounted in a carrier 14 on the slide 12. Furthermore, the carrier 14 supports a second spindle 17 for a grinding wheel 17a which is designed to treat the internal surfaces of workpieces. Reference may be had to commonly owned copending patent application Ser. No. 734,906 filed May 16, 1985 by Rudolf Beyer et al. for "Tailstock for universal grinding machines" which describes and shows a grinding machine with spindles for several grinding wheels as well as a tailstock which is reciprocable relative to the frame of the grinding machine. The spindle 17 for the grinding wheel 17a can be driven by a prime mover 18 which is mounted on the carrier 14. The means for reciprocating the carriage 8 along the guide means 4, 6 comprises a feed screw 9 and a reversible prime mover 10 for the feed screw. The latter mates with a nut of the carriage 8.

A pivot drive 19 for the carrier 14 is mounted on the slide 12.

The spindle 15 for the grinding wheel 16 receives torque from a main prime mover 21, e.g., in a manner as disclosed in the commonly owned copending patent application Ser. No. 708,265 filed Mar. 5, 1985 by Jürgen Brill et al for "Grinding machine". The major portion of the grinding wheel 16 is surrounded by a hood 22 which is provided with an opening to enable the working surface of the grinding wheel 16 to engage the workpiece 50 between the work holding members 26 and 28. The center 23 of the work holding member 26 is driven by a motor 27 on the bracket 29. The purpose of the adjustability of the work holding member (tailstock) 28 in the longitudinal direction of the front side 3a of the base 3 (i.e., along the path which is defined by the guide means 31) is to enable the work holding members 26, 28 to properly hold and rotate relatively short, medium long or long workpieces The guide means 31 are parallel to the axis which is defined by the centers 23, 24 and parallel to the supporting surface 2 but normal to the additional guide means 11 on the carriage 8 of the tool supporting unit 7.

The grinding machine further comprises composite shrouds 32 and 33 for the guide means 31 and 4, 6, respectively. These shrouds are mounted on the base 3 and each thereof comprises two portions which are telescoped into or closely overlap each other. One part of the shroud 32 moves with the tailstock 28 relative to the other part which is affixed to the base 3. One part of the shroud 33 moves with the carriage 8 relative to the other part which is secured to the base 3.

The liquid coolant which is sprayed onto the workpiece 50, and more particularly into the area where the working surface of the grinding wheel 16 or 17a engages a workpiece between the work holding members 26, 28 or on the work holding member 26 (depending upon whether the grinding wheel 16 is to remove material from the external surface of a workpiece or the grinding wheel 17a is to remove material from a bore, socket or like cavity or passage of a workpiece) is stored in a suitable source 134 (this source can constitute a water tap) and a conduit 34 which conveys the coolant from the source 134 to the material removing station and can be provided with one or more nozzles 234 serving to discharge one or more streams, sprays or other formations of coolant to such station. The workpiece 50 between the work holding members 26, 28 is disposed at a level above a coolant collecting vessel 36 which is adjacent to and is preferably pivotably or otherwise movably mounted at the front side 1a of the frame 1. This can be radially seen in FIG. 1 which shows that liquid coolant which trickles or streams from the material removing station (in the region of the nozzle or nozzles 234) can bypass at least the major part of or the entire base 3 (i.e., the latter is located rearwardly of the path of liquid coolant which descends from the workpiece into the vessel 36). This ensures that the temperature of the base 3 is not influenced at all, or is influenced only negligibly, by the coolant so that the coolant cannot adversely affect the quality of treatment to which the workpieces are subjected. The shrouds 32 and 33 keep the sprays of coolant away from the respective guide means 4, 6 and 31 to even further reduce the likelihood of temperature changes in such highly sensitive portions of the grinding machine, i.e., in those portions which are most likely to affect the quality of the workpieces. The likelihood that the coolant could unduly influence the temperature of the base 3 is further reduced due to the fact that the work holding members 26, 28 are installed at the front side 3a of the base, and due to the fact that the entire base slopes through the acute angle alpha so as to promote the flow of coolant (if any) from its upper side toward and into the collecting vessel 36 (whereby the shrouds 32 and 33 prevent the coolant from splashing onto the respective guide means 4, 6 (particularly 4) and 31. The inclination of the base 3 with reference to the horizontal entails a similar inclination of the parts of the tool supporting unit 7 thereon which also reduces the likelihood of accumulation of coolant close to or on the bed 3.

It has been found that approximately 60 percent of liquid coolant issuing from the nozzle or nozzles 234 completely bypasses the bed 3. Another 30 percent of coolant flows between the workpiece which is held by the centers 23, 24 or by the center 23 alone and the grinding wheel 16 and also bypasses (at least substantially) the base 3. The remaining 10 percent or so of coolant is entrained by the peripheral surface of the rotating grinding wheel 16 to issue from the hood 22. At least the major part of this smallest percentage of coolant is prevented from contacting the bed 3 by the shrouds 32 and 33. Moreover, the shrouds 32, 33 and the adjacent portions of the bed 3 define air gaps or clearances 37 and 38 which enable insulating layers of air therein to prevent sprays and/or mists of coolant from influencing the temperature of the base 3.

The improved machine tool renders it possible to dispense with the conventional carriage-table system and, by the simple expedient of properly selecting the position of the center of the workpiece between the centers 23, 24 (i.e., by properly selecting the positions of the work holding members 26 and 28), the workpiece is located so far in front of the front side 3a of the base 3 that the latter is not contacted by the descending coolant and/or that the coolant cannot even indirectly influence the temperature of the base. The placing of the guide means 4 close to or into immediate proximity of the upper guide means 31 also contributes to a pronounced reduction of the possibility of inaccurate treatment of the workpieces because the difference between the temperature of the guide means 4 and the adjacent guide means 31 is nil or negligible. All in all, the improved machine tool ensures a much more predictable treatment of workpieces because the temperature of the base cannot be altered by the coolant or, at the very least, because the influence of liquid coolant upon the temperature of the base 3 cannot fluctuate within a wide range.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A machine tool, particularly a circular grinding machine, comprising a base having an elongated front side, a rear side, a top side inclined relative to said front side, first guide means extending longitudinally of said front side and second guide means at said top side; a tool supporting unit movably mounted on said second guide means; and at least one work holding member mounted on said base and movable along said first guide means at the front side of said base.

2. The machine tool of claim 1, wherein said second guide means extends longitudinally of said front side, said tool supporting unit comprising a carriage mounted on said base and movable along said second guide means, said carriage comprising additional guide means extending at right angles to said second guide means and said tool supporting unit further comprising a slide mounted on said carriage and reciprocable along said additional guide means, and at least one tool support mounted on said slide.

3. The machine tool of claim 2, wherein said first and said second guide means are at least substantially horizontal.

4. The machine tool of claim 2, wherein said first and said second guide means include portions which are closely adjacent to each other.

5. The machine tool of claim 4, wherein each of said portions includes substantially horizontal ways and the ways of said second guide means are located at a level above the ways of said first guide means.

6. The machine tool of claim 2, further comprising shrouds for said guide means.

7. The machine tool of claim 2, wherein said top side of said base slopes at an acute angle to the horizontal in a direction from said front toward said rear side thereof.

8. The machine tool of claim 7, further comprising a floor-mounted frame for said base, said frame having a supporting surface which is inclined to the horizontal through an angle which at least approximates said acute angle, said base being mounted on said supporting surface.

9. The machine tool of claim 7, further including a source of liquid coolant, means for conveying the coolant from said source against the workpiece which is held by said work holding member, and means for collecting the coolant which descends from the workpiece, said collecting means being located forwardly of said base.

10. The machine tool of claim 9, wherein the workpiece which is held by said work holding member is located forwardly of said base so that at least the major percentage of coolant flowing from such workpiece toward and into said collecting means bypasses said base.

11. The machine tool of claim 10, further comprising shrouds overlying said guide means so as to shield such guide means from contact with the coolant.

12. A circular grinding machine, comprising a floor-mounted frame having a front side and a rear side; a base mounting on said frame and sloping upwardly in a direction from said front side toward said rear side, said base having an elongated front side adjacent to and located at a level above the front side of said frame, a top side which is inclined relative to said front side and a rear side; a collecting vessel adjacent to the front side of said frame; parallel horizontal first and second guide elements provided at the top side of said base intermediate the front and rear sides of the base and extending in the longitudinal direction of the front side of said base; third and fourth guide elements provided on said base adjacent to the front side thereof and parallel with said first and second guide elements; a tailstock mounted for reciprocatory movement along said third and fourth guide elements and arranged to engage a workpiece which is to be treated in the machine; a tool supporting unit having a carriage mounted on and reciprocable along said first and second guide elements; a source of liquid coolant; and means for conveying coolant from said source against the workpiece which is engaged by said tailstock, said tailstock being located at a level above the front side of said base and the workpiece which is engaged by said tailstock being located at least substantially above said vessel so that the coolant which descends from the workpiece flows toward and into said vessel, said base being located rearwardly of the region of flow of coolant from the workpiece into said vessel so that the coolant cannot appreciably influence the temperature of said base.

13. The machine of claim 12, wherein said carriage comprises additional guide means sloping upwardly and rearwardly in a direction from the front side toward the rear side of said base and said unit further comprises a slide which is reciprocable along said additional guide means, and at least one tool on said slide.

14. The machine of claim 12, further comprising shrouds which overlie at least one of said first and second guide elements and at least one of said third and fourth guide elements to shield the respective guide elements from splashing coolant.

15. The machine of claim 12, further comprising a work-engaging headstock mounted on said base.

* * * * *